United States Patent
Starov et al.

(10) Patent No.: US 11,444,977 B2
(45) Date of Patent: Sep. 13, 2022

(54) INTELLIGENT SIGNATURE-BASED ANTI-CLOAKING WEB RECRAWLING

(71) Applicant: Palo Alto Networks, Inc., Santa Clara, CA (US)

(72) Inventors: Oleksii Starov, Santa Clara, CA (US); Zhanhao Chen, Sunnyvale, CA (US); Yuchen Zhou, Santa Clara, CA (US); Fang Liu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 275 days.

(21) Appl. No.: 16/659,917

(22) Filed: Oct. 22, 2019

(65) Prior Publication Data
US 2021/0120034 A1  Apr. 22, 2021

(51) Int. Cl.
*H04L 9/40* (2022.01)
*G06F 16/23* (2019.01)
*G06F 16/958* (2019.01)
*G06F 16/951* (2019.01)
*G06F 21/56* (2013.01)

(52) U.S. Cl.
CPC ...... *H04L 63/1483* (2013.01); *G06F 16/2379* (2019.01); *G06F 16/951* (2019.01); *G06F 16/972* (2019.01); *G06F 21/563* (2013.01); *G06F 2221/033* (2013.01)

(58) Field of Classification Search
CPC .................................................. H04L 63/1483
See application file for complete search history.

(56) References Cited

U.S. PATENT DOCUMENTS

| | | | |
|---|---|---|---|
| 9,531,736 B1 * | 12/2016 | Torres | H04L 63/1441 |
| 9,977,900 B2 * | 5/2018 | Wang | H04L 63/1483 |
| 10,044,750 B2 * | 8/2018 | Livshits | G06F 21/56 |
| 2008/0140626 A1 * | 6/2008 | Wilson | G06F 16/951 |
| 2015/0261955 A1 * | 9/2015 | Huang | G06F 21/562 |
| | | | 726/23 |

(Continued)

FOREIGN PATENT DOCUMENTS

WO 2016012868 A1 1/2016

OTHER PUBLICATIONS

Invernizzi, et al., "Cloak of Visibility: Detecting When Machines Browse a Different Web", Proceedings of 2016 IEEE Symposium on Security and Privacy (SP), May 22-26, 2016, San Jose, CA, 17 pages.

(Continued)

*Primary Examiner* — Simon P Kanaan
(74) *Attorney, Agent, or Firm* — Gilliam IP PLLC

(57) ABSTRACT

Web sites are crawled using multiple browser profiles to avoid malicious cloaking. Based on web page content returned from HTTP requests using the multiple browser profiles, web sites returning substantively different content to HTTP requests for different browser profiles are identified. Web sites are further filtered by common cloaking behavior, and redirect scripts are extracted from web page content that performed cloaking. Signatures comprising tokenized versions of the redirect scripts are generated and compared to a database of known cloaking signatures. URLs corresponding to signatures having approximate matches with signatures in the database are flagged for recrawling. Recrawled URLs are verified for malicious cloaking again using HTTP requests from multiple browser profiles.

20 Claims, 5 Drawing Sheets

(56) References Cited

U.S. PATENT DOCUMENTS

2016/0012240 A1* 1/2016 Smith .................. G06F 21/606
  726/1
2017/0195353 A1* 7/2017 Taylor ................. G06F 12/0813

OTHER PUBLICATIONS

Oest, et al., "PhishFarm: A Scalable Framework for Measuring the Effectiveness of Evasion Techniques Against Browser Phishing Blacklists", Proceedings of 2019 IEEE Symposium on Security and Privacy (SP), May 20-22, 2019, San Francisco, CA, 18 pages.
Wang, et al., "Cloak and Dagger: Dynamics of Web Search Cloaking", Proceedings of the ACM Conference on Computer and Communications Security, Oct. 17-21, 2011, Chicago, IL, 13 pages.
PCT Application Serial No. PCT/US2020/056730, International Search Report, dated Dec. 17, 2020, 3 pages.
PCT Application Serial No. PCT/US2020/056730, International Written Opinion, dated Dec. 17, 2020, 5 pages.
Mansoori, et al., "YALIH, Yet Another Low Interaction Honeyclient", AISC '14: Proceedings of the Twelfth Australasian Information Security Conference—vol. 149, Jan. 2014, 10 pages.
Singh, et al., "MalCrawler: A Crawler for Seeking and Crawling Malicious Websites", Distributed Computing and Internet Technology. ICDCIT 2017 Lecture Notes in Computer Science, vol. 10109., Nov. 26, 2016, 14 pages.
Zeeuwen, et al., "Improving Malicious URL Re-Evaluation Scheduling Through an Empirical Study of Malware Download Centers", WebQuality '11: Proceedings of the 2011 Joint WICOW/AIRWeb Workshop on Web Quality, 2011, 3 pages.

* cited by examiner

INTELLIGENT SIGNATURE-BASED ANTI-CLOAKING WEB RECRAWLING

BACKGROUND

The disclosure generally relates to the field of information security and to web crawling.

Cloaking is a technique with possible legitimate purposes that can also be used to mask malicious content from a web crawler. The cloaked website delivers content selectively based on available information about a website user (e.g. internet protocol (IP) address, received hypertext transfer protocol (HTTP) headers), or redirects to content selectively after obtaining additional information with scripts rendered inside the user's browser. In instances where the cloaking is malicious, suspected web crawlers are shown a benign version of website content and vulnerable users are shown malicious (e.g. phishing) content. In addition, malicious cloaking can be used to target specific victims (e.g. mobile users or outdated browser versions). Web crawlers can detect cloaking post-factum by accessing the same website multiple times using multiple browser profiles (corresponding to the format of HTTP GET requests, available JavaScript APIs and their returned parameters). Malicious content can be detected using a malware detection system on content returned by the website in response to the multiple browser profiles. In this case, cloaking is labeled malicious.

Fuzzy matching is a method for matching text using computer-assisted translation. A parser extracts sentence or word level tokens from sections of text and computes a similarity score between sections of text based on their respective tokens. At a high level, a "fuzzy similarity score" is computed between sections of text with the similarity score representing the cost of transforming one sequence of tokens to another sequence of tokens (i.e. via replacement, insertion, deletion operations). Sections of text can be matched according to a threshold fuzzy similarity score.

BRIEF DESCRIPTION OF THE DRAWINGS

Aspects of the disclosure may be better understood by referencing the accompanying drawings.

DESCRIPTION

Figure 1:
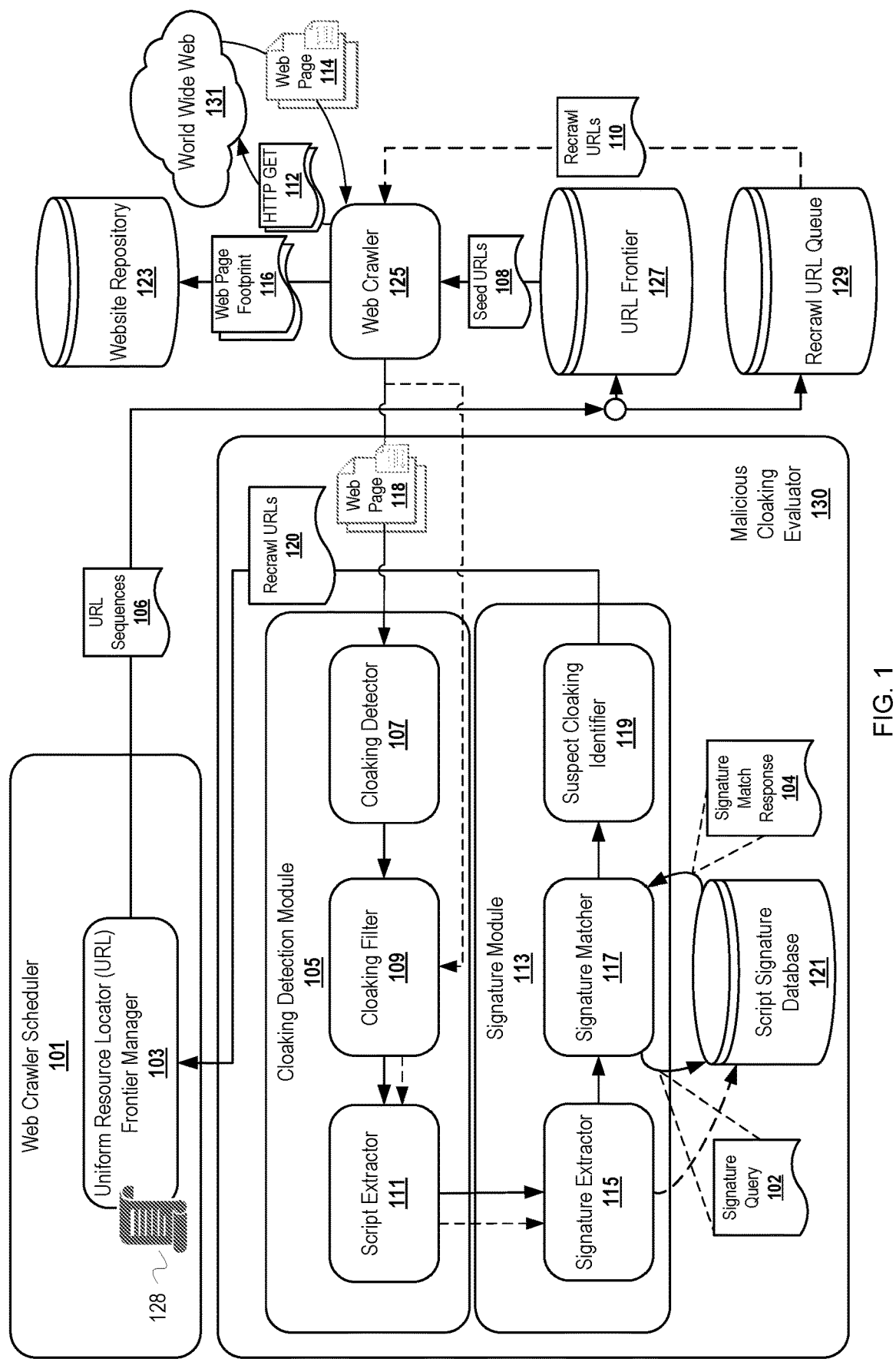
FIG. 1 depicts a system diagram for a web crawler using intelligent, signature-based recrawling.

The description that follows includes example systems, methods, techniques, and program flows that embody aspects of the disclosure. However, it is understood that this disclosure may be practiced without these specific details. For instance, this disclosure refers to fuzzy matching of scripts with a high propensity of malicious cloaking using script signatures in illustrative examples. Aspects of this disclosure can be also applied to fuzzy matching of script signatures indicating malicious activity in the context of endpoint security. In other instances, well-known instruction instances, protocols, structures and techniques have not been shown in detail in order not to obfuscate the description.

Overview

Typical web crawler systems operate by crawling uniform resource locators (URLs) in a URL frontier (i.e., data structure identifying URLs to crawl). Selection of URLs for insertion into the URL frontier is according to selection policy. A selection policy guides selection of URLs to visit based on resource allocation, website query frequency, etc. A selection policy can additionally be defined to cause a web crawler system to select a subset (e.g. 10%) of URLs to recrawl. Recrawls can be selected randomly, but random recrawl selection selects a high frequency of benign and non-cloaking URLs which wastes recrawling resources. The current disclosure proposes to recrawl by intelligently selecting URLs for recrawl that have a high likelihood to correspond to malicious cloaking. This intelligent crawler system operates in communication with a web crawler that interacts with the world wide web to download content from URLs via multiple browser profiles and render it similarly to web browsers, detect suspected cloaking, and to update its' URL frontier with recrawl URLs based on suspected cloaking. Prior to normal operations for detecting malicious cloaking (and in parallel with normal operations), the web crawler creates and maintains a database of known malicious signatures. The web crawler selects a subset of recrawl URLs (e.g., uniformly at random) and verifies malicious cloaking on the recrawl URLs. Signatures are extracted from recrawl URLs with verified malicious cloaking that correspond to the observed cloaking redirect scripts and these signatures populate the database of known malicious signatures. Subsequently, for intelligent recrawling, cloaking is detected in two phases—first, URLs are filtered based on common cloaking behavior and a script is extracted from a known post-factum cloaked website that corresponds to a redirect based on the common cloaking behavior. Second, a signature is extracted from the script that can be matched with a signature corresponding to known cloaking behavior in the known malicious signature database. Scripts and the corresponding URLs that have signatures corresponding to known cloaking behavior are added by the web crawler system to a recrawl URL queue to later be recrawled by the web crawler.

In the first phase, the web crawler submits multiple HTTP GET requests for a URL, each HTTP GET request containing metadata indicating a different browser profile (e.g. metadata indicating Android operating system, iOS® operating system, Chrome® browser, Internet Explorer® browser, etc.) and originating from agents with multiple screen sizes, browser orientations, etc. The server associated with the URL returns content for each browser profile that is forwarded to a cloaking detector. The cloaking detector is configured to detect differences in content across browser profiles that is not due to formatting differences (i.e. differences when converting a website from desktop to mobile format). If the cloaking detector detects differences in content across the browser profiles, a cloaking filter classifies whether the responses to each HTTP GET request for each browser profile indicate a likelihood of cloaking. For example, the cloaking filter can extract scripts running on the downloading profile based on the HTTP GET response and analyze the scripts for when a first content page is received across multiple browser profiles, but final redirections are different. For a URL with content that is indicated as cloaking by the cloaking detector and cloaking filter above, a script extractor searches through the stack trace of the web crawler for content requests corresponding to the URL that contain a cloaking redirection. The script extractor isolates a script retrieved from the stack trace that performed the redirection.

In the second phase, a signature module extracts a signature from the script. The signature module matches the signature with a database of signatures corresponding to known cloaking scripts. The signature is a footprint of the script (e.g. after various machine translation and parsing steps) that will be identical for a different script that is syntactically distinct but functionally equivalent. Various levels of granularity in matching that allow for various levels of fidelity across matched scripts are possible, at the expense of resources to compute signatures. The levels of fidelity correspond to accuracy of identifying cloaking behavior between a signature stored in the database and the extracted signature. If the extracted signature matches a stored signature, the signature module forwards the corresponding URL to the policy generator to be added to the recrawl queue. The sequence of detection, extraction, and matching operations acts as a pipeline that successively narrows candidate URLs using intelligent criterion that promote a high likelihood to correspond to malicious cloaking.

Example Illustrations

FIG. 1 depicts a system diagram for a web crawler using intelligent, signature-based recrawling. The illustrated system includes a web crawler scheduler 101, a malicious cloaking evaluator 130, and a web crawler 125. The web crawler scheduler 101 supplies URL sequences for crawling by the web crawler 125 and the web crawler 125 fetches and parses corresponding web pages. The malicious cloaking evaluator 130 identifies URLs suspected of malicious cloaking and communicates these suspect URLs to the web crawler scheduler 101 to schedule recrawls. The web crawler scheduler 101 comprises a URL frontier manager 103. The URL frontier manager 103 updates a URL frontier 127 according to a selection policy 128 and recrawl URLs identified by the malicious cloaking evaluator 130. The malicious cloaking evaluator 130 includes a cloaking detection module 105 and a signature module 113 communicatively coupled to a script signature database 121. The web crawler scheduler 101 sends URL sequences 106 to the URL frontier 127 and a recrawl URL queue 129, although recrawl URLs need not be maintained in a separate structure. The URL frontier 127 and recrawl URL queue send seed URLs 108 and recrawl URLs 110, respectively, to the web crawler 125. The web crawler 125 includes a fetcher (or downloader) that sends HTTP GET requests 112 to the world wide web 131, which sends web pages 114 in response to the HTTP GET requests 112. The web crawler 125 then sends the web pages 118 to the cloaking detection module 105. The web crawler 125 also stores web page footprints 116 in a website repository 123.

The cloaking detection module 105 comprises a cloaking detector 107, a cloaking filter 109, and a script extractor 111. These components work in a pipeline to determine whether each of the web pages 118 is likely to correspond to a maliciously cloaked web site and to extract a script for each web page that executes a cloaking redirection for that web page. The cloaking detection module 105 forwards these redirect scripts to a signature module 113. The signature module 113 comprises a signature extractor 115, a signature matcher 117, and a suspect cloaking identifier 119. The signature extractor 115 normalizes the redirect scripts into a format that expresses the functionality of the script without extraneous language-level information—this format of the redirect script is called a "signature." The signature matcher 117 receives signatures corresponding to redirect scripts from the signature extractor 115. The signature matcher 117 is communicatively coupled with a script signature database 121. The signature matcher 117 sends a signature query 102 corresponding to a redirect script signature and receives a signature match response 104 from the script signature database 121, indicating whether the redirect script signature approximately matches one of the known malicious cloaking signatures in the script signature database 121. The signature matcher 117 sends redirect script signatures with a positive approximate match to a suspect cloaking identifier 119. The suspect cloaking identifier 119 sends candidate recrawl URLs 120 based on matched redirect script signatures to the URL frontier manage 103, which updates its' internal recrawling policy accordingly.

The URL frontier manager 103 maintains the policy 128 (i.e. a set of rules) that dictates what URLs occur in what order in the URL sequences 106. This policy 128 is a combination of various policies that determine what new ("seed set") URLs to visit, which already seen ("recrawl") URLs to re-visit, as well as how to parallelize nodes in the web crawler 125 and how to avoid sending too many HTTP GET requests to the same web site in a short time frame ("politeness policy"). For example, the policy 128 can be an internal ranking of URLs, where the highest ranked URL is entered into the URL sequences 106 first. The ranking can be determined as a weighted average of a ranking for seed URLs and a ranking for recrawl URLs, along a penalization term (i.e. negative weight) for how frequently the web site corresponding to a URL has been visited within a recent time frame (e.g., last minute/hour/day). An internal ranking of recrawl URLs by the URL frontier manager 103 can be determined using the recrawl URLs 120. For example, this ranking can simply be the order in which the recrawl URLs 120 are received by the URL frontier manager 103. The URL frontier manager 103 can delete recrawl URLs or seed URLs to maintain a desired ratio (e.g. 1 to 10) of recrawl URLs to seed URLs. Alternatively, the URL frontier manager 103 can stop generating seed URLs while the desired ratio is maintained. Recrawl URLs suspected of malicious cloaking can be deleted based on a likelihood of corresponding to a malicious cloaking web site being below a threshold likelihood. This likelihood can be stored as metadata in the candidate recrawl URLs.

The web crawler 125 reads seed URLs 108 from the URL frontier 127 and recrawl URLs 110 from the recrawl URL queue 129. The web crawler 125 can read/dequeue URLs from the URL frontier 127 and the recrawl URL queue 129 based on a schedule indicating a frequency at which the web crawler 125 should fetch web pages in a same domain, a ratio of seed URLs to recrawl URLs, parallelization of threads/processes within the web crawler 125, etc. For each URL, the web crawler 125 sends an HTTP GET request 112 for that URL via the world wide web 131 (via name servers). For example, the web crawler 125 can send the following HTTP GET request:

GET/webpage.htm HTTP/1.1
User-Agent: Chrome 76.0.3809
Host: www.maliciouscloakedwebsite.com
Accept-language: en-us
Connection: Keep-Alive In order to detect malicious cloaking, the web crawler 125 can send multiple HTTP GET requests for a URL (in this case, www.maliciouscloakedwebsite.com) each having a different User-Agent (e.g., Internet Explorer 11, Firefox 68.02, etc.). In response, a server hosting the web site for the URL sends web pages 114 via the world wide web. The web pages 114 comprise HTTP GET response messages that contain web page content embedded as a text string with program code that is executable to display the web page on a client computer. For example, the text string can be a string of JavaScript® code and the HTTP GET response header can indicate that the code embedded is in JavaScript. The web crawler 125 can extract the web pages 118 comprising the web page content as well as an indicator of the programming language of the web page content and send it to the cloaking detection module 105.

The cloaking detection module 105 filters the web pages 118 by criteria that indicate a high likelihood of malicious cloaking, and extracts redirect scripts from the filtered web pages which it sends to the signature module 113. This pipeline of filtering web pages and extracting redirect scripts is described in greater detail with reference to FIG. 2.

The signature extractor 115 receives redirect scripts and generates their corresponding signatures. The signature is generated in a preprocessing step that can be variably computationally intensive depending on available resources to compute script signatures. For example, a parser embedded on the signature extractor 115 can tokenize a redirect script to extract programming commands. The tokenization can occur by word, by line, or by a standard imposed by a programming language. For example, if a script is written in JavaScript, the parser can maintain an index of functional JavaScript language such as "function," "var," "type," "return," etc. and can parse the JavaScript code by tokenizing these words, can tokenize delimiters, can remove comments indicated by "// . . . ," and can replace variable/function names with standardized names. Each tokenized variable/function name, functional word, and delimiter can be stored as a sequence of tokens by the parser. Alternatively, the parser can only replace known variable names (i.e. words not in the index of functional language) with standardized names and can do only some of the above parsing operations. In some embodiments, the parser extracts a substring or set of substrings of the redirect script (for example, between certain delimiters in the script). Regardless of the type of preprocessing used, the result is a sequence of tokens (here the word token is generalized to include unprocessed sub strings of program code). The parser can be configured to tokenize redirect scripts having program code in multiple programming languages and can generate tokens that are standardized across programming languages.

The signature matcher 117 receives sequences of tokens corresponding to redirect scripts from signature extractor 115 and sends a signature query 102 to the script signature database 121. The signature query 102 comprises the token sequence received by the signature matcher 117. The script signature database 121 searches for a known malicious signature that is within a threshold fuzzy matching distance of the signature query 102. The fuzzy matching distance can be any type of distance between sequences of tokens. For example, the Levenshtein distance which measures the number of insertions, deletions, or substitutions to get from one sequence of tokens to another, can be used. Mathematically, the Levenshtein distance between string a and string b can be computed as $lev_{a,b}(|a|, |b|)$, where $|a|$ is the length of string a, and $lev_{a,b}(i, n)=\max(i, j)$ if $\min(i, j)=0$, $\min(lev_{a,b}(i-1,j)+1, lev_{a,b}(i,j-1)+1, lev_{a,b}(i-1,j-1)+1_{a_i \neq b_j})$ otherwise. Here, $1_{a_i \neq b_j}$ is the indicator function of whether the ith entry of string a does not equal the jth entry of string b and i and j are integers. The recursive equation can be computed using dynamic programming by solving for an $|a| \times |b|$ matrix whose entries measure the Levenshtein distance of intermediate strings between a and b (as determined by the above formula). The tokenized sequences can be shortened so that this algorithm does not take a long time to compute. In some embodiments, the signature query 102 can only be compared to a subset of the known malicious signatures stored in the script signature database 121 by ruling out certain sets of signatures. Signatures can be indexed in the script signature database 121 based on these rules.

As an alternative to computing the Levenshtein distance between tokenized redirect scripts, the script signature database 121 can perform substring matching on substrings of the signature query 102 with known malicious signatures (substrings of known malicious redirect scripts). For example, substrings related to user-agent checking in the HTTP GET request can be retrieved. This can speed up the comparison step because strings are searched for an exact match, but still suffers from the computational cost of selecting substrings from the signature query 102, and performance can vary depending on which substrings are selected.

As an additional alternative, the sequences of tokens received by the signature matcher 117 can be hashed using a fuzzy hashing algorithm, and the signature query 102 comprises this fuzzy hash. The script signature database 121 searches for a matching fuzzy hash stored in its' database of fuzzy hashes (i.e. signatures). Fuzzy hashing, as implemented for example in the program ssdeep, combines a traditional piecewise hashing algorithm with a rolling hash that constructs hashes that only depend on a fixed length sequence before a current token. The algorithm begins by computing the traditional hash using tokens in sequence and simultaneously computing the rolling hash along the sequence. When a computed rolling hash produces a trigger value from an index of trigger values, the traditional hash value is stored in the signature query 102 and the traditional hash resets. The triggers can be rolling hash values corresponding to known cloaking behavior, or otherwise contextually related to malicious cloaking.

In some embodiments, instead of using a distance between tokenized scripts, the script signature database 121 can comprise a machine learning model (e.g. a neural network) that is pre-trained on known malicious and benign cloaking scripts to output a likelihood of malicious cloaking. The machine learning model can be any type of model that can classify text-based data, for example a feedforward neural network, a convolutional neural network, a multinomial naive Bayes classifier, etc. In addition to a tokenization step, the signature extractor 115 can perform additional preprocessing steps used in natural language processing such as extracting term frequency-inverse document frequency features. The machine learning model is trained to convergence on known malicious and benign cloaking scripts and can be verified on a separate set of malicious and benign cloaking scripts for generalization error. Instead of matching the signature query 102 with a database of known cloaking signatures, the script signature database 121 can use the signature query 102 as input to the machine learning model. The signature match response 104 can comprise the output of the machine learning model (i.e. a probability value indicating likelihood that the signature query 102 corresponding to a malicious cloaking script).

Any of the above signatures, fuzzy matching distances, and fuzzy hashes can be used in combination for the same signature and in combination across multiple signatures. The script signature database 121 can comprise multiple databases corresponding to signature type, and the signature query 102 can comprise a signature type that indicates which database to search for a signature match. The type of signature and signature comparison can be chosen according to computational resources, desired query time, a severity of suspected cloaking as indicated by the cloaking detector 107 and the cloaking filter 109, parallelization of the downloader 125 as it receives seed URLs 108 and recrawl URLs 110, etc.

The signature matcher 117 sends signatures corresponding to positive matches with the script signature database 121 as well as the corresponding URLs to the suspect cloaking identifier 119. The signature matcher 117 can further send severity metrics for each signature that comprise severity metrics indicated by the cloaking detector 107 and the cloaking filter 109, as well as a severity metric correlated with a fuzzy matching distance computed by the script signature database and a severity metric for the corresponding known maliciously cloaked script. The suspect cloaking identifier 119 can select recrawl URLs 120 according to a set of threshold severity metrics corresponding to each of the above.

In addition to the above operations for detecting cloaking in seed URLs 108, a separate pipeline is implemented with dotted connectors in FIG. 1 for processing the recrawl URLs 110. This pipeline starts with web pages 118 corresponding to recrawl URLs 110 which are forwarded to the cloaking filter 109. The cloaking filter verifies common cloaking behavior in the recrawl URLs 110 as described above, the script extractor 111 extracts redirect scripts, and the signature extractor 115 extracts signatures from the redirect scripts for the recrawl URLs 110 with verified cloaking which are stored in the script signature database 121. Before operations of the malicious cloaking evaluator 130 begin, this pipeline from the web crawler 125 to the cloaking filter 109, to the script extractor 111, to the signature extractor 115, and finally to the script signature database 121 can be used on a subset of recrawl URLs 110 chosen uniformly at random to verify malicious cloaking and populate the script signature database 121 with signatures for the subset of recrawl URLs 110. Subsequently, during normal operations of the malicious cloaking evaluator 130, the script signature database 121 can be updated with signature for recrawl URLs 110 with verified malicious cloaking. These updates can be continuous or can run separately according to an update schedule.

Figure 2:
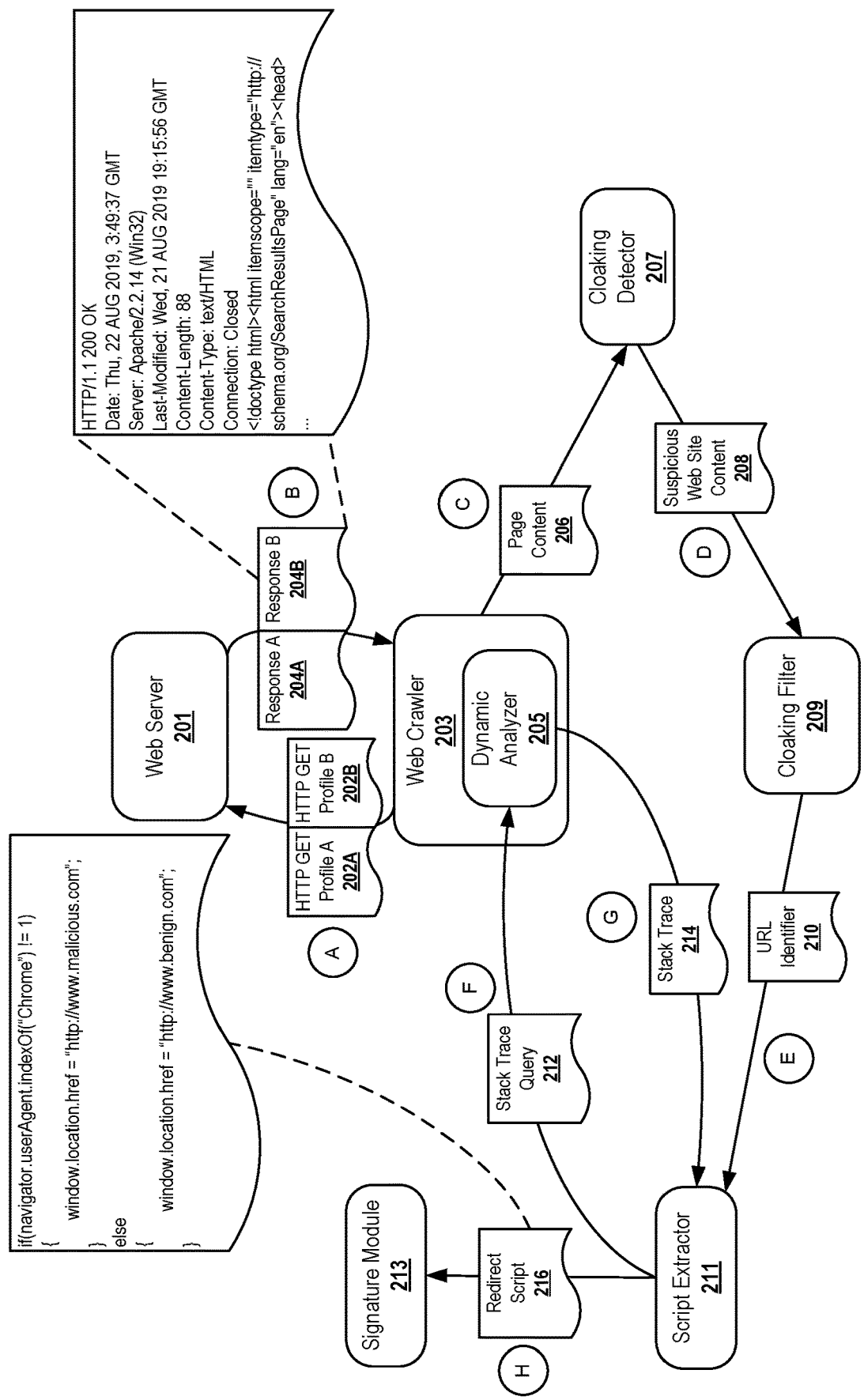
FIG. 2 depicts a system diagram for a cloaking detection module that extracts redirect scripts from potentially malicious URLs.

FIG. 2 depicts a system diagram for a cloaking detection module that extracts redirect scripts from potentially malicious URLs. The overall process is first described before a more detailed example with stages. A web server 201 is communicatively coupled with a web crawler 203 and receives an HTTP GET request 202A indicating a profile A and an HTTP GET request 202B indicating a profile B. In response, the web server 201 sends response A 204A and response B 204B to the web crawler 203. The web crawler 203 loads web site response A 204A and web site response B 204B and runs code contained therein to extract page content 206, which it sends to a cloaking detector 207. The cloaking detector 207 analyzes the page content 206 for possible malicious cloaking and sends suspicious web site content 208 to a cloaking filter 209. The cloaking filter 209 further analyzes the suspicious web site content 208 for possible malicious cloaking and extracts a URL identifier 210 which it sends to a script extractor 211. The script extractor 211 is communicatively coupled to a dynamic analyzer 205 that is embedded in the web crawler 203. The script extractor 211, based on the URL identifier 210, sends a stack trace query 212, and the dynamic analyzer 205 responds with a stack trace 214. The script extractor 211 extracts a redirect script 216 from the stack trace 214 and sends the redirect script 216 to a signature module 213.

FIG. 2 is annotated with a series of letters A-H. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the web crawler 203 sends HTTP GET request 202A for profile A and HTTP GET request 202B for profile B to the web server 201. The HTTP GET requests 202A and 202B both comprise a same host and different request-header fields such as user-agent, from, accept-encoding, authorization, etc. The request-header fields are chosen for each HTTP GET profile such that a maliciously cloaked web site will generate different responses based on the profiles. For example, a maliciously cloaked web site may suspect that a user-agent corresponding to an iOS operating system is more vulnerable than a user agent corresponding to a Chrome web browser, and therefore HTTP GET request 202A indicating profile A can have a user-agent field iOS 10.14.6, and HTTP GET request 202B indicating profile B can have a user-agent field Chrome 76.0.3809. The web crawler 203 can send more than two HTTP GET requests to the web server 201 for more than two HTTP GET profiles to have a higher likelihood of sending a profile that triggers malicious cloaking.

At stage B, the web server 201 sends web site response A 204A and web site response B 204B to the web crawler 203. An example response has a status-line 200 ok, a date header field Thu 22 Aug. 2019 3:49:37 GMT, a server header field Apache/2.2.14 (Win32), a last-modified header field Wed 21 Aug. 2019 19:15:56 GMT, a content-length header field 88, a content-type header field text/hypertext markup language (HTML), and a connection header field closed. The example response further comprises HTML code for web site content that can have embedded scripts that run when a parser processes the HTML code. A malicious cloaked web site can send a redirect script in the content contained in web site response A 204A or web site response B 204B. The redirect script can be the JavaScript code "window.location.replace (www.benign.com)," which simulates an HTTP redirect to the URL www.benign.com. The redirect script can be implemented by the maliciously cloaked web site to forward a suspected web crawler to a benign content page.

At stage C, the web crawler 203 parses content in web site response A 204A and web site response B 204 B and sends the page content 206 to the cloaking detector 207. The web crawler 203 can comprise multiple agents that run web site response A 204A and web site response B 204B. The agents can execute code embedded in the responses 204A and 204B, and can respond to JavaScript queries for parameters such as web browser height, web browser width, web browser orientation, etc. that can further indicate user profile A and user profile B. For example, if user profile A for HTTP GET request 202A has a UserAgent of Chrome, then an agent on the web crawler 203 can send the parameters web browser height 853, browser width 480, and browser orientation vertical in response to a JavaScript query embedded in the web site response A 204 A. Such a user profile A can be designed to emulate a user running a chrome browser on an Android phone. The page content 206 comprises web page content from each web site response received by the web crawler 203 as well as an indicator for each profile that was sent to get the web site response.

The cloaking detector 207 receives the page content 206 and identifies substantive differences in content from each web page. A substantive difference is a difference in web page content that is not a result of the web site formatting the web page according to different browser/operating system profiles. For example, a web site can reformat headers/paragraphs so that a web page is easier to read on a mobile display. The cloaking detector 207 can parse the page content 206 to extract content that does not depend on mobile versus web browser formatting. The cloaking detector can extract sub strings from the page content 206 and look for a predetermined ratio of exactly matching sub strings to determine if the content is the same across web pages. In other embodiments, the cloaking detector 207 can use a fuzzy matching distance, as described variously above, to determine whether web page content from multiple web site responses is close enough (according to the fuzzy matching distance) to correspond to the same web page, or other string-based distances can be used. The cloaking detector 207 can be configured to parse and/or remove formatting code from the page content 206.

At stage D, the cloaking detector 207 sends suspicious web site content 208 having substantive differences in content from multiple web pages to the cloaking filter 209. The cloaking detector 207 can filter page content 206 that doesn't have substantive differences in content. The suspicious web site content 208 can have formatting code removed by the cloaking detector 207. The cloaking filter 209 receives the suspicious web site content 208 and scans it for common cloaking behavior. For example, the cloaking filter 209 can scan the suspicious web site content 208 for a JavaScript redirect command such as window.location.replace( ).

At stage E, the cloaking filter 209 extracts the URL identifier 210 for a web site that indicates common cloaking behavior (e.g., a JavaScript redirect command). The URL identifier 210 is extracted from the suspicious web site content 208.

At stage F, the script extractor 211 receives the URL identifier 210 and generates the stack trace query 212 based on the URL identifier 210. The stack trace query 212 indicates the URL identifier 210 and can further indicate a web site response that was executed by the web crawler 203 to generate potentially malicious web site content for the URL identifier 210. The dynamic analyzer 205 receives the stack trace query 212 accesses the run-time stack of the web crawler 203 to extract a redirect script for the stack trace query 212. The run-time stack includes dynamically allocated memory that stores processes executed by the web crawler 203 in a last in, first out format. The dynamic analyzer 205 iterates through the run-time stack to extract events executed by a process or processes running on the web crawler 203 to perform an HTTP redirection for the URL identifier 210. The dynamic analyzer 205 can identify a chain of processes corresponding to the redirect script, where each process initiated the next process in the chains. Depending on computational efficiency of the pipeline from the web crawler 203 to the cloaking detector 207, the cloaking filter 209, and the script extractor 211, the web crawler 203 can maintain a large allocation of dynamic memory so that the run-time stack includes the redirect script that was executed at the beginning of this pipeline.

At stage G, the dynamic analyzer 205 returns the stack trace 214 for the process executed on the web crawler 203 that performed a malicious HTTP redirection. The stack trace 214 comprises the redirect script extracted by the dynamic analyzer from the run-time stack and the URL identifier 210.

At stage H, the script extractor 211 sends the redirect script 216 to the signature module 213 to generate a signature for the redirect script 216, compare the signature to a database of known maliciously cloaked signatures, and add the URL identifier 210 to a set of candidate recrawl URLs if the database match is positive, as described variously above. An example redirect script is depicted that determines whether the user agent of the web crawler 203 is Chrome with the JavaScript code "if(navigator.userAgent.indexOf("Chrome")!=1 and, based on determining that the user agent is not Chrome, modifies the URL of the current page to be "http://malicious.com." Otherwise, the URL of the current page is set to "http://www.benign.com." Although depicted in JavaScript code, the redirect script 216 can be logs of a sequence events executed by processes running on the web crawler 203 as a result of running the JavaScript code.

The operations for intelligent recrawling of URLs depicted in FIGS. 1 and 2 can be performed based on a criterion for whether intelligent recrawling is effective compared to random recrawling. This criterion can be that the following inequality holds:

$$\text{DRate}(\text{Rand}(U, r)) < \text{DRate}(\text{Rand}(U,m) + \text{Intel}(U,r-m)),$$

where DRate is the percentage of malware detections versus overall number of crawls and recrawls, U is a set of seed URLs, r is a number of URLs to recrawl, Rand(U,r) is a function that selects r URLs from U uniformly at random, and Intel(U,r–m) is a function that selections r–m entries from U according to the intelligent recrawling operations described in FIGS. 1 and 2. The choice of m can be maximized over several trial rounds such that the right hand side of the above inequality is maximized. The optimal choice of m can be used to determine what percentage of recrawl URLs are chosen uniformly at random and what percentage are chosen using intelligent recrawling.

Figure 3:
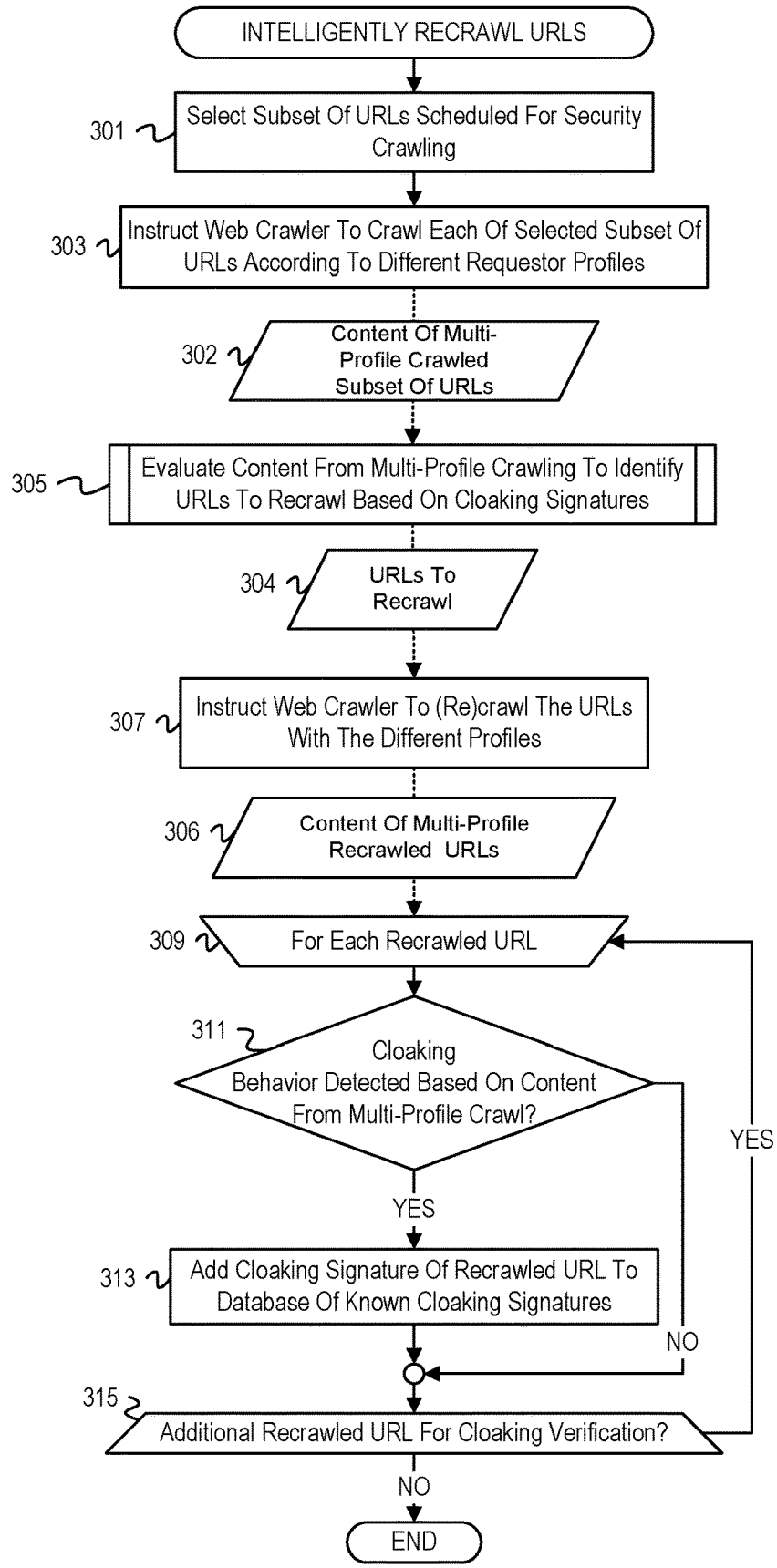
FIG. 3 is a flowchart of example operations for intelligently recrawling URLs.

FIG. 3 is a flowchart of example operations for intelligently recrawling URLs. The operations in FIG. 3 are described in reference to a scheduler and a crawler for consistency with earlier descriptions and are placeholder names that indicate program functionality.

At block 301, the scheduler selects a subset of URLs scheduled for security crawling. The selection may be according to a selection criterion or may be a (quasi) random selection. The scheduler selects URLs from a pool of un-crawled URLs. The selection criterion can comprise a rule to avoid URLs that have been frequently pinged by the crawler to avoid overloading servers hosting the URLs. The selection criterion can further comprise an index of importance metrics for URLs that includes URL visits, importance of words or tokens in the URL, etc. URLs can be normalized by the scheduler prior to crawling to avoid revisiting URLs, and certain URLs can be favored for crawling based on words or tokens present after normalization. For example, the scheduler can favor URLs with a PDF or PostScript extension when crawling for academic papers.

At block 303, the scheduler instructs the crawler/spider to crawl each of the selected subset of URLs according to different requestor profiles. For each URL in the selected subset of URLs, the crawler sends multiple HTTP requests to the URL using different requestor profiles. The different requestor profiles correspond to metadata in headers of the HTTP requests, for instance different user-agents for different web browsers or operating systems, as described variously above. The crawler can additionally query the URL from a different IP address to avoid malicious web sites that only display malicious content to first time visitors. The scheduler receives HTTP responses from the URL for each requestor profile, and adds content extracted from the HTTP responses to content of multi-profile crawled subset of URLs 302.

At block 305, the scheduler evaluates content from multi-profile crawling to identify URLs to recrawl based on cloaking signatures. The scheduler can comprise a cloaking module and signature module to perform these operations, as described in greater detail in reference to FIG. 4.

At block 307, the web crawler receives URLs to recrawl 304 from the scheduler and instructions to recrawl the URLs with different requestor profiles. The web crawler recrawls the URLs using different requestor profiles which can be the same requestor profiles used at block 303. In other embodiments, the web crawler can choose different requestor profiles in order to avoid being identified by the URLs as a web crawler and receiving benign content in response. The web crawler can send HTTP requests to the URLs with different user-agent headers to those previously used at block 303.

At block 309, the scheduler receives content of multi-profile recrawled URLs and begins iterating over each recrawled URL. The loop of operations includes example operations in blocks 311 and 313.

At block 311, the scheduler determines whether cloaking behavior is detected based on content from the multi-profile crawl of the recrawled URL at the current iteration. Cloaking behavior can be detected based on differences in content from the multi-profile crawl as described at block 305 and in greater detail at block 401 with reference to FIG. 4. If the scheduler detects cloaking behavior based on content from the multi-profile crawl, operations proceed to block 313. Otherwise, operations proceed to block 315.

At block 313, the scheduler adds the verified cloaking signature of the recrawled URL to a database of known cloaking signatures. The scheduler can extract key substrings or key sequence of tokens in the cloaking signature to be used as an index of the cloaking signature in the database of known cloaking signatures. This operation is optional, and the database of known cloaking signatures can be maintained independently of the operations depicted in FIG. 3.

At block 315, the scheduler detects additional recrawled URLs for cloak verification. If an additional recrawled URL for cloak verification is detected, operations return to block 309. Otherwise, if no additional recrawled URLs are detected, the operations in FIG. 3 are complete.

Figure 4:
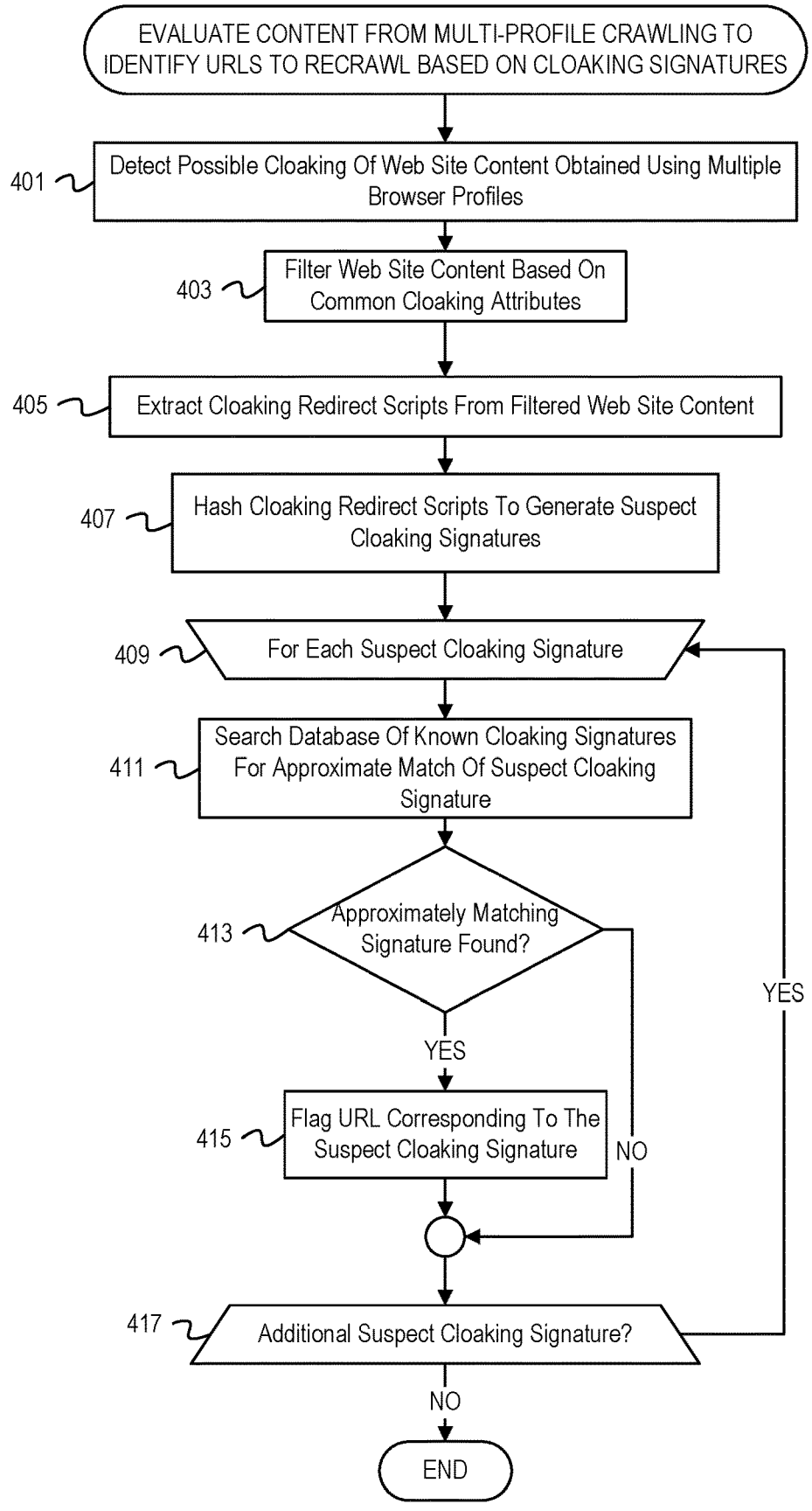
FIG. 4 is a flowchart of example operations for evaluating content from multi-profile crawling and identifying URLs to recrawl based on cloaking signatures.

FIG. 4 is a flowchart of example operations for evaluating content from multi-profile crawling and identifying URLs to recrawl based on cloaking signatures for the content. The operations in FIG. 4 are described in reference to a cloaking module and a signature module for consistency with earlier descriptions and are placeholder names that indicate program functionality.

At block 401, the cloaking module detects possible cloaking of web site content obtained using multiple browser profiles. The cloaking module compares web site content returned across browser profiles and identifies substantive differences in the content as described variously above. The cloaking module filters out web site content that does not have substantive differences in content across browser profiles.

At block 403, the cloaking module filters web site content based on common cloaking attributes. The cloaking module can search for JavaScript redirect code in the web site content that is common for maliciously cloaked web sites. Alternatively, the cloaking module can search for redirect commands in different scripting languages or markup languages such as HTML, cascading style sheets (CSS), etc. Any known common cloaking attribute can be detected by the cloaking module at this stage and used to filter web site content that does not comprise the common cloaking attribute.

At block 405, the cloaking module extracts cloaking redirect scripts from filtered web site content. The cloaking module queries a dynamic analyzer to search a stack trace of function calls that occurred while executing the content to find redirect scripts. If no redirect script is found, the dynamic analyzer can return a null value or failure code to the cloaking module, and the cloaking module can further filter out web site content for which no redirect script is found.

At block 407, the cloaking module sends the cloaking redirect scripts to the signature module which hashes the cloaking redirect scripts to generate suspect cloaking signatures. The hashing operation of cloaking redirect scripts comprises a tokenization and/or substring extraction operation as described variously above.

At block 409, the signature module begins iterating over each suspect cloaking signature in the suspect cloaking signatures generated at block 407. The loop of operations includes example operations in blocks 411, 413, and 415.

At block 411, the signature module searches a database of known cloaking signatures for an approximate match of a suspect cloaking signature at the current loop iteration. The database can be indexed according to common cloaking signature formats such as common sequences of tokens, common substrings, etc. and the database search can be performed by scanning the suspect cloaking signature for common cloaking signature formats in the index. The approximate match can be found using any of the aforementioned fuzzy matching distances.

At block 413, the signature module determines whether an approximately matching signature has been found. The signature module can compute a fuzzy matching distance between matches in a database index with the suspect cloaking signature. If an approximately matching signature is found, for example a signature in the database index with fuzzy matching distance to the suspect cloaking signature, operations proceed to block 415. Otherwise, if no approximate matches to the suspect cloaking signature are found in the database, operations proceed to block 417.

At block 415, the signature module flags the URL having a suspect cloaking signature with an approximate matching signature in the database for recrawling. The sequence of operations in blocks 401, 403, 405, 407, 411, and 413 ensure that the flagged URL has a high likelihood of malicious cloaking. Flagged URLs determined at block 415 can later be sent into a queue of URLs to recrawl to verify cloaking behavior.

At block 417, the signature module detects whether there are additional suspect cloaking signatures. If the signature module detects an additional suspect cloaking signature, operations proceed to block 409. Otherwise, the operations in FIG. 4 are complete.

The examples often refer to a cloaking detection module and a signature module. The cloaking detection module and signature module are constructs used to refer to implementation of functionality for filtering potentially malicious web site content, generating signatures for the potentially malicious web site content, verifying the signatures against a database of known malicious cloaking signatures, and generating a list of candidate URLs for malicious cloaking. This construct is utilized since numerous implementations are possible. A cloaking detection module or signature module may be a particular component or components of a machine (e.g., a particular circuit card enclosed in a housing with other circuit cards/boards), machine-executable program or programs, firmware, a circuit card with circuitry configured and programmed with firmware, etc. The term is used to efficiently explain content of the disclosure. Although the examples refer to operations being performed by a cloaking detection module and signature module, different entities can perform different operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 301, 303, 305, and 307 can be performed in parallel or concurrently. With respect to FIG. 4, block 405 is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
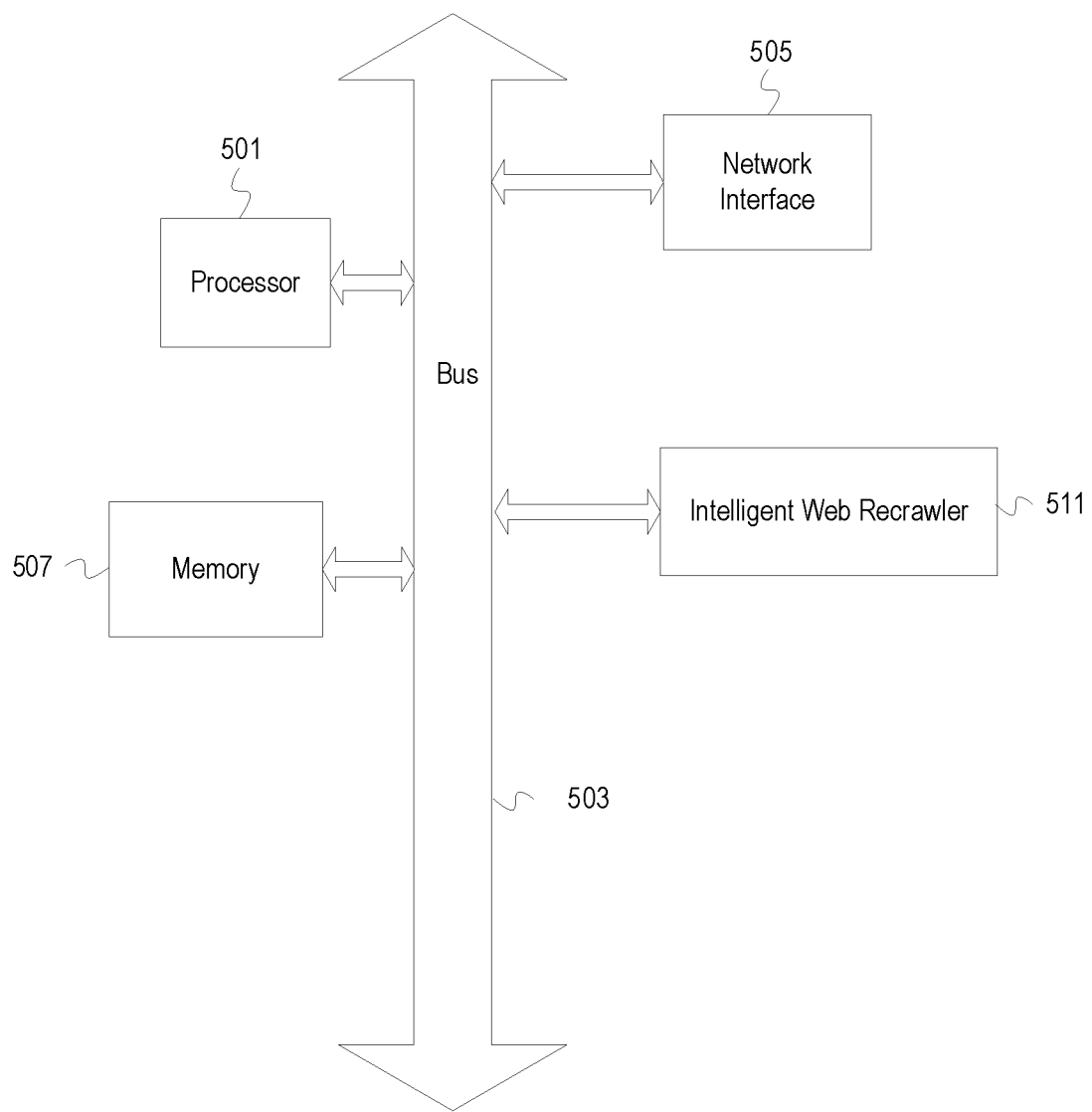
FIG. 5 depicts an example computer system that intelligently recrawls websites with suspected malicious cloaking.

FIG. 5 depicts an example computer system with an intelligent web recrawler that recrawls websites with suspected malicious cloaking. The computer system includes a processor 501 (possibly including multiple processors, multiple cores, multiple nodes, and/or implementing multithreading, etc.). The computer system includes memory 507, a bus 503, and a network interface 505. The system also includes an intelligent web recrawler 511. The intelligent web recrawler 511 can generate lists of candidate URLs that have a high likelihood of malicious cloaking and can update its' crawl sequence according to the list of candidate URLs. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5. The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for intelligent web recrawling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
identifying a first uniform resource locator (URL) at which cloaking program code is being used based, at least in part, on different content returned responsive to multiple requests to the first URL with different requestor profiles;
generating a first signature of the cloaking program code in the content, wherein generating the first signature comprises generating first tokens corresponding to one or more strings in the cloaking program code, wherein the first tokens are standardized across a plurality of programming languages;
determining whether the first tokens in the first signature at least partially match second tokens in one of a plurality of signatures of malicious cloaking program code; and
based on a determination that the first tokens in the first signature at least partially match the second tokens in one of the plurality of signatures, flagging the first URL for recrawling.

2. The method of claim 1 further comprising recrawling with at least two different requestor profiles a set of URLs flagged for recrawling including the first URL and verifying that cloaking program code is being used at the first URL based on the recrawling.

3. The method of claim 2 further comprising updating a database of malicious cloaking program code signatures with the first signature based on verification that cloaking program code is being used at the first URL.

4. The method of claim 1 further comprising:
selecting a first subset of URLs from a plurality of URLs to be crawled, wherein the first subset of URLs includes the first URL; and
for each of the first subset of URLs, requesting content with at least two different requestor profiles.

5. The method of claim 4, wherein selecting the first subset of URLs comprises arbitrarily selecting the first subset of URLs.

6. The method of claim 1, wherein flagging the first URL for recrawling is based, at least in part, on a fuzzy matching distance between the first tokens in the first signature and the second tokens in the one of the plurality of signatures of malicious cloaking program code.

7. The method of claim 1, further comprising, for each request to the first URL with a different requestor profile, storing in a website repository a digital footprint of content returned responsive to the request to the first URL.

8. A non-transitory computer-readable medium having instructions stored thereon that are executable by a computing device to perform operations comprising:
determining, from content returned responsive to multiple requests to a first uniform resource locator (URL) with different requestor profiles, whether the first URL satisfies a first criterion of common cloaking behavior;
based on a determination that the first URL satisfies the first criterion, generating a first signature for cloaking program code in the content, wherein generating the first signature comprises generating first tokens corresponding to one or more strings in the cloaking program code, wherein the first tokens are standardized across a plurality of programming languages;
determining whether first tokens in the first signature at least partially match second tokens in one of a plurality of signatures of malicious cloaking program code; and
based on a determination that the first tokens in the first signature at least partially match the second tokens in one of the plurality of signatures, flagging the first URL for recrawling.

9. The non-transitory computer-readable medium of claim 8, wherein the instructions executable by the computing device further comprise instructions to recrawl with at least two different requestor profiles a set of URLs flagged for recrawling including the first URL and verify that cloaking program code is being used at the first URL based on the recrawling.

10. The non-transitory computer-readable medium of claim 9, wherein the instructions executable by the computing device further comprise instructions to update a database of malicious cloaking program code signatures with the first signature based on verification that cloaking program code is being used at the first URL.

11. The non-transitory computer-readable medium of claim 8, wherein the instructions executable by the computing device further comprise instructions to:
select a first subset of URLs from a plurality of URLs to be crawled, wherein the first subset of URLs includes the first URL; and
for each of the first subset of URLs, request content with at least two different requestor profiles.

12. The non-transitory computer-readable medium of claim 11, wherein the instructions executable by the computing device to select the first subset of URLs comprise instructions to arbitrarily select the first subset of URLs.

13. The non-transitory computer-readable medium of claim 8, wherein the instructions executable by the computing device to flag the first URL for recrawling comprise instructions executable by the computing device to flag the first URL for recrawling based, at least in part, on a fuzzy matching distance between the first tokens in the first signature and the second tokens in the one of the plurality of signatures of malicious cloaking program code.

14. The non-transitory computer-readable medium of claim 8, wherein the instructions executable by the computing device further comprise instructions to, for each request to the first URL with a different requestor profile, store in a website repository a digital footprint of content returned responsive to the request to the first URL.

15. An apparatus comprising:
a processor; and
a computer-readable medium having instructions stored thereon that are executable by the processor to cause the apparatus to,
send multiple requests with different requestor profiles to each of a set of uniform resource locators (URLs);
for each URL, compare content received responsive to the requests with different profiles indicates cloaking behavior for the URL;
for each URL for which cloaking behavior is indicated, generate a first signature for cloaking program code in the corresponding content wherein generating the first signature comprises generating first tokens corresponding to one or more strings in the cloaking program code, wherein the first tokens are standardized across a plurality of programming languages;

determine whether the first tokens in the first signature at least partially match second tokens in one of a plurality of signatures of malicious cloaking program code;

based on a determination that the first tokens in first signature at least partially match the second tokens in one of the plurality of signatures, indicate the URL for recrawling.

16. The apparatus of claim 15, wherein the instructions stored on the computer-readable medium further comprise instructions executable by the processor to cause the apparatus to update a database of malicious cloaking program code signatures with the first signature based on verification that cloaking program code is being used at the URL.

17. The apparatus of claim 15, wherein the instructions executable by the processor to cause the apparatus to flag the URL for recrawling comprise instructions to flag the URL for recrawling based, at least in part, on a fuzzy matching distance between the first tokens in the first signature and the second tokens in the one of the plurality of signatures of malicious cloaking program code.

18. The method of claim 1, wherein the plurality of signatures of the malicious cloaking program code were generated from second tokens corresponding to one or more strings in the malicious cloaking program code, wherein the second tokens are standardized across the plurality of programming languages, wherein the first tokens and second tokens indicate, at least in part, functionality of the one or more strings in the cloaking program code and the one or more strings in the malicious cloaking program code, respectively.

19. The non-transitory computer-readable medium of claim 8, wherein the plurality of signatures of the malicious program code were generated from second tokens corresponding to one or more strings in the malicious cloaking program code, wherein the second tokens are standardized across the plurality of programming languages, wherein the first tokens and second tokens indicate, at least in part, functionality of the one or more strings in the cloaking program code and the one or more strings in the malicious cloaking program code, respectively.

20. The apparatus of claim 15, wherein the plurality of signatures of the malicious cloaking program code were generated from second tokens corresponding to one or more strings in the malicious cloaking program code, wherein the second tokens are standardized across the plurality of programming languages, wherein the first tokens and second tokens indicate, at least in part, functionality of the one or more strings in the cloaking program code and the one or more strings in the malicious cloaking program code, respectively.

* * * * *